UNITED STATES PATENT OFFICE.

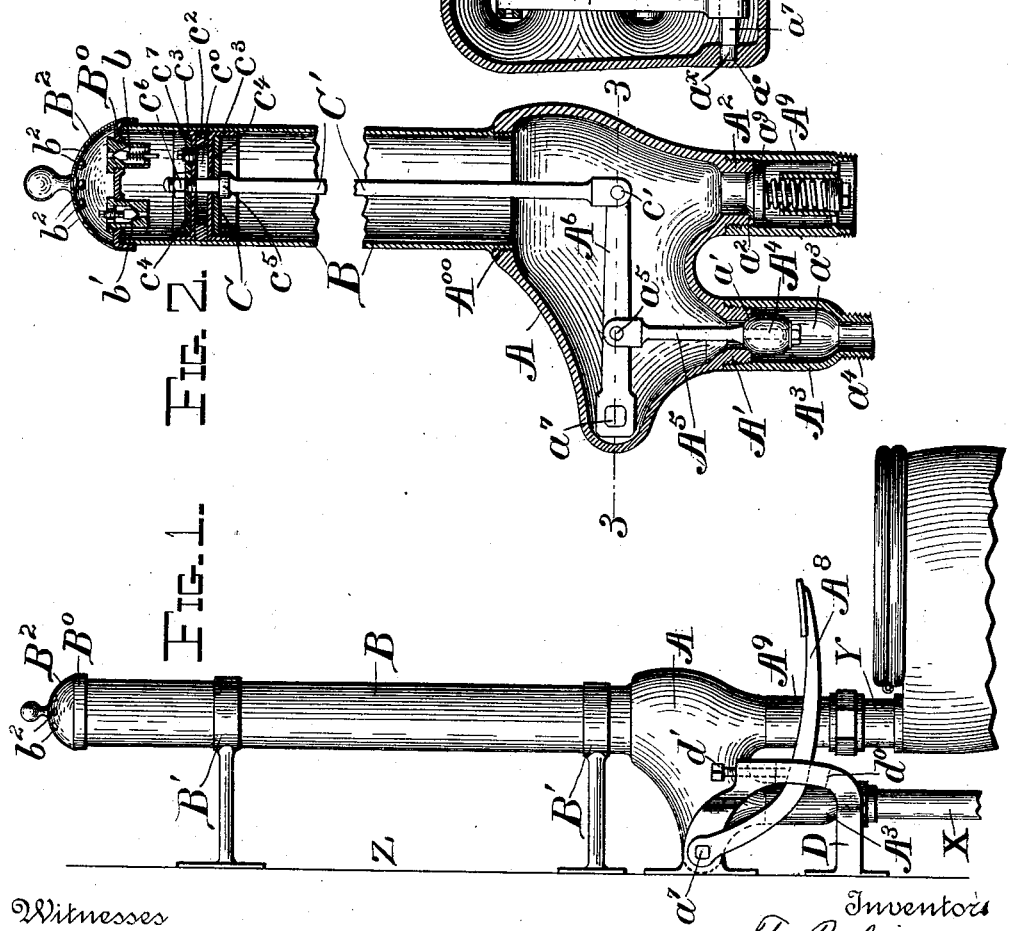

FRANK ROBINSON, HARRY T. EMERSON, AND WILLIAM O. CARLSON, OF MENOMINEE, MICHIGAN; SAID CARLSON ASSIGNOR TO DENIS M. RAICHE, OF MARINETTE, WISCONSIN.

FLUSHING DEVICE FOR WATER-CLOSETS.

SPECIFICATION forming part of Letters Patent No. 628,357, dated July 4, 1899.

Application filed August 24, 1898. Serial No. 689,427. (No model.)

*To all whom it may concern:*

Be it known that we, FRANK ROBINSON, HARRY T. EMERSON, and WILLIAM O. CARLSON, citizens of the United States, residing at 5 Menominee, in the county of Menominee and State of Michigan, have invented certain new and useful Improvements in Flushing Devices for Water-Closets; and we do hereby declare the following to be a full, clear, and exact description of the invention, such as will enable others skilled in the art to which it appertains to make and use the same.

Our invention relates to improvements in devices for flushing the bowls of water-closets, and has for its object to produce a flushing connection which possesses many advantages over similar devices now in use.

Our invention consists in the novel arrangement of valves and connections hereinafter described and claimed, and it will be understood by reference to the accompanying drawings, wherein the same parts are indicated by the same letters throughout the several views.

Figure 1 represents a side elevation of our closet-flushing attachment as fitted to the bowl of a water-closet. Fig. 2 represents a central vertical section, enlarged, through the flushing attachment; and Fig. 3 represents a horizontal section taken on the line 3 3 in Fig. 2, looking down.

A represents a hollow shell having at its under side two small open exteriorly-screw-threaded necks A' and $A^2$, the latter being preferably somewhat larger in diameter than the former, as shown. Each of these necks has a valve-seat upon its outer opening, as at $a'$ and $a^2$, for a downwardly-opening valve, as hereinafter more fully described.

The neck A' is fitted with a short connection $A^3$, which screws upon the said neck, has a chamber $a^3$ for the working of the valve $A^4$, hereinafter referred to, and has a reduced portion $a^4$, which may be connected to water-supply pipe shown at X in Fig. 1. The valve $A^4$, working in its chamber $a^3$ in the connection $A^3$, is preferably a solid ball of rubber or some such material which will fit closely its seat $a'$. Connected to this valve $A^4$ is a rod or stem $A^5$, which is shown as having a reduced end passing through the valve and secured by a nut, and this rod or stem is pivotally connected at its upper end, as at $a^5$, to a horizontal arm $A^6$, at or near the middle of the latter, within the shell A. The said arm $A^6$ has an angular opening through one end, through which opening passes an angular portion $a^7$ of a horizontal shaft $A^7$ at right angles to the arm $A^6$. The shaft $A^7$ is mainly cylindrical, as seen in Fig. 3, and passes through a hollow lateral extension of the shell $A^0$, wherein it has a rotation limited by the arm $A^6$ thereon. The said shaft may have a reduced cylindrical end $a^x$, which fits into a shallow socket or opening $a^0$ in the interior wall of the shell A, as shown in Fig. 3. Rigidly mounted upon the outer end of the shaft $A^7$ is an arm $A^8$, by means of which the said shaft may be given a partial rotation from without. This partial rotation of the said shaft imparts a swinging movement in a vertical plane to the arm $A^6$ within the shell A, corresponding to the movement of the outer arm $A^8$, and as the said arm $A^6$ rises or falls about its pivotal point the valve $A^4$ is moved to its closed or open position, as will be readily seen.

The neck $A^2$, hereinbefore referred to, is fitted with a short connection $A^9$, which screws at one end upon the said neck and carries a spring-pressed valve $a^9$, held normally closed by its spring upon the valve-seat $a^2$. The lower end of the connection $A^9$ is exteriorly screw-threaded to connect with the pipe leading directly into the closet-bowl, as shown at Y in Fig. 1.

At the upper side of the shell A is an enlarged opening $A^{00}$, interiorly screw-threaded, and into this screw-threaded opening is fitted one end of a cylinder B, which stands vertically above said shell and when in use is preferably held steady in position by brackets B' B', which inclose said cylinder and are fixed to the wall of the room or an upright, (indicated by the line Z in Fig. 1.) This cylinder is provided at its upper end with a head $B^0$, into which are fitted a check-valve $b$ and an adjustable escape-valve $b'$. Over this head $B^0$ is preferably fitted an ornamental cover or cap $B^2$, provided with perforations $b^2$ for the admission and escape of air.

Within the cylinder B is mounted a piston C, having vertical piston-rod $C'$, which is pivotally connected at its lower end to the end of the horizontal arm $A^6$ within the shell A, as shown at $c'$ in Fig. 2. The piston C comprises a central annular ring $c^2$, of metal or some hard substance, a pair of leather disks $c^3 c^3$, and a pair of metallic disks $c^4 c^4$, fitted upon the leather disks at opposite sides of the piston. The piston-rod $C'$ has a boss $c^5$ near its upper end and has its upper end screw-threaded and fitted with a nut $c^6$. The said end of the piston-rod passes through central openings in the several disks comprising the piston, and when the nut is screwed thereon the metallic disks $c^4 c^4$ are pressed together between the boss and the nut and bind the leather disks upon the central ring, as clearly seen in Fig. 2.

It is intended that the piston shall fit closely within the cylinder; but in order that it may move smoothly and with as little friction as possible we provide means for injecting a lubricant into this piston. For this purpose a screw-threaded opening is made through one of the metallic disks and through its adjacent leather disk, leading to the annular space $c^0$ within the piston. Through this opening, which is fitted with a screw-plug $c^7$, oil or other lubricant is injected into the annular space $c^0$ above referred to and by being absorbed by the leather disks gradually the piston is kept lubricated.

The operation of the device is as follows: When the flushing attachment is in its normal position, the inlet-valve $A^4$ and the outlet-valve $a^9$ are both closed and the piston C is at the uppermost position of its travel within the cylinder B. To flush the closet-bowl, the arm $A^8$, which is conveniently located for that purpose, is depressed by the hand or arm of the person. This depression of the said arm $A^8$ causes a corresponding depression of the arm $A^6$ within the shell A, and thereby simultaneously opens the inlet-valve $A^4$ and draws the piston C downward. The check-valve $b$ admits air to the cylinder above the piston with sufficient rapidity to relieve the partial vacuum there created, so that the said piston in its downward stroke offers but little resistance. At the time that the inlet-valve is opened water rushes into the shell A and creates directly a downward pressure upon the outlet-valve $a^9$ and by compressing the air within the cylinder B creates an upward pressure upon the piston C therein. The arm $A^8$ should be held depressed for an instant in order to allow the inrushing water to fill the shell A and then released. The pressure of the inrushing water within the shell A causes the outlet-valve $a^9$ to open against the pressure of its spring, and until this pressure is relieved sufficiently to allow the spring of the valve to react water will flow past the said valve and into the closet-bowl. The pressure of the water within the shell A, while acting to keep the outlet-valve open, is at the same time acting upon the lower side of the piston C and tending to force the latter upward in the cylinder B. This upward movement is made comparatively slow by reason of the fact that the air above the piston can escape but slowly through the escape-valve $b'$, and this valve being made adjustable to and from its seat the resistance to the upward movement of the piston may be regulated at will to control the amount of water which may flow through the shell in the interval between the releasing of the arm $A^8$ and the final closing of the inlet-valve. It will be seen that as the piston ascends, the arm $A^6$, to which the piston is connected by the rod $C'$, will be raised, and the inlet-valve $A^4$, connected thereto, will be moved upward toward its seat and finally entirely closed, thus stopping the flow of water, and thereby releasing the pressure within the shell A and allowing the outlet-valve $a^9$ to return to its seat through the pressure of its spring. This operation is repeated each time it is desired to flush the bowl by the simple depression of the arm $A^8$.

In order that the inlet-valve may not be opened too wide, the arm $A^8$ is preferably confined within a bracket D, provided with a vertical slot $d^0$, (shown in dotted lines in Fig. 1,) so that when the valve is opened sufficiently the arm $A^8$ will strike the lower end of this slot and its further downward movement will be arrested. An adjustable screw $d'$ at the upper end of the slot $d^0$ may be arranged, as shown, to be struck by the arm $A^8$ at its upper position, and so relieve excessive pressure upon the inlet-valve.

Having thus described our invention, what we claim, and desire to secure by Letters Patent of the United States, is—

1. In a flushing device for the purpose described, the combination with a hollow shell provided with connections for an inlet-pipe and an outlet-pipe; a hand-operated valve controlling the inlet to said shell; a spring-pressed valve controlling the outlet from said shell, and a cylinder communicating with said shell; of a piston working in said cylinder and having a piston-rod connected to said inlet-valve; and valves in the head of said cylinder for controlling the admission of air thereto and the discharge of air therefrom, substantially as described.

2. In a flushing device for the purpose described, the combination with a hollow shell provided with connections for an inlet-pipe and an outlet-pipe; a valve controlling the inlet to said shell; a swinging arm pivoted within said shell and connected to said inlet-valve, an outer arm rigidly connected to said arm within said shell, for moving the latter; a cushioning-cylinder communicating with the interior of said shell, a piston working therein and connected to the said arm within said shell, and an outlet-valve opened by the pressure of water within said shell, substantially as described.

3. In a flushing device for the purpose described, the combination with a hollow shell provided with connections for an inlet-pipe and an outlet-pipe; and having an air-cylinder fitted thereto; a check-valve within the head of said cylinder, and an adjustable escape-valve also within the head of said cylinder, a piston working in said cylinder, an inlet-valve connected to said piston; hand-operated devices for opening said inlet-valve, which is closed by the pressure within said cylinder acting upon said piston; of an outlet-valve opened by the pressure of water within said shell, and adapted to close automatically when said pressure is relieved, substantially as described.

4. In a flushing device for the purpose described, the combination with a hollow shell provided with connections for an inlet-pipe and an outlet-pipe; of a valve for controlling said inlet, a cushioning-cylinder communicating with the interior of said shell, a piston therein connected to said inlet-valve; means for opening said valve by hand from without said shell; and a valve opened by the pressure of water and air within said shell, substantially as described.

In testimony whereof we affix our signatures in presence of two witnesses.

FRANK ROBINSON.
HARRY T. EMERSON.
WILLIAM O. CARLSON.

Witnesses:
  HENRY W. PACKER,
  JAS. D. QUIMBY.